US010699535B2

(12) United States Patent
von der Lippe et al.

(10) Patent No.: US 10,699,535 B2
(45) Date of Patent: Jun. 30, 2020

(54) DOCUMENT OF VALUE PROCESSING DEVICE AND METHOD FOR OPERATING A DOCUMENT OF VALUE PROCESSING DEVICE

(71) Applicant: Wincor Nixdorf International GmbH, Paderborn (DE)

(72) Inventors: Carsten von der Lippe, Paderborn (DE); Bernd Redecker, Luebbecke (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 294 days.

(21) Appl. No.: 15/923,711

(22) Filed: Mar. 16, 2018

(65) Prior Publication Data

US 2018/0268663 A1 Sep. 20, 2018

(51) Int. Cl.
| | |
|---|---|
| *G06Q 40/00* | (2012.01) |
| *G07F 19/00* | (2006.01) |
| *G07D 11/20* | (2019.01) |
| *G06Q 20/10* | (2012.01) |

(52) U.S. Cl.
CPC ....... *G07F 19/203* (2013.01); *G06Q 20/1085* (2013.01); *G07D 11/20* (2019.01); *G07F 19/00* (2013.01)

(58) Field of Classification Search
CPC .... G07F 19/20; G07F 19/201; G06Q 20/1085
USPC ........................................................ 235/379
See application file for complete search history.

(56) References Cited

U.S. PATENT DOCUMENTS

| | | | | |
|---|---|---|---|---|
| 5,739,509 A | * | 4/1998 | Watanabe | G07D 11/26 235/379 |
| 5,813,510 A | * | 9/1998 | Rademacher | G07D 1/04 194/206 |
| 6,338,048 B1 | * | 1/2002 | Mori | G06Q 20/00 705/41 |
| 2005/0173515 A1 | * | 8/2005 | Sawa | G07F 9/026 235/379 |

(Continued)

FOREIGN PATENT DOCUMENTS

EP     2595124 A1     5/2013

OTHER PUBLICATIONS

Extended European search report issued in the corresponding European application; 6 pages.

*Primary Examiner* — Ahshik Kim
(74) *Attorney, Agent, or Firm* — Black, McCuskey, Souers & Arbaugh, LPA

(57) ABSTRACT

According to various embodiments, a document of value processing device may include: a secured chamber configured to accommodate one or more documents of value and to protect at least one handling device from unauthorized access; the at least one handling device disposed inside the secured chamber to handle at least an output of the one or more documents of value out of the secured chamber may; a control circuit coupled to the at least one handling device to control an operation of the at least one handling device; and a security circuit disposed inside the secured chamber. The security circuit is configured to receive a cryptographically processed signal, to verify the received cryptographically processed signal, and to disable or enable the operation of the at least one handling device based on a verification result.

15 Claims, 6 Drawing Sheets

(56) References Cited

U.S. PATENT DOCUMENTS

| | | | |
|---|---|---|---|
| 2009/0118861 A1* | 5/2009 | Kanagawa | G07F 19/20 |
| | | | 700/231 |
| 2009/0320106 A1* | 12/2009 | Jones | G06Q 20/1085 |
| | | | 726/5 |
| 2018/0082509 A1* | 3/2018 | Fujita | B65H 31/24 |

* cited by examiner

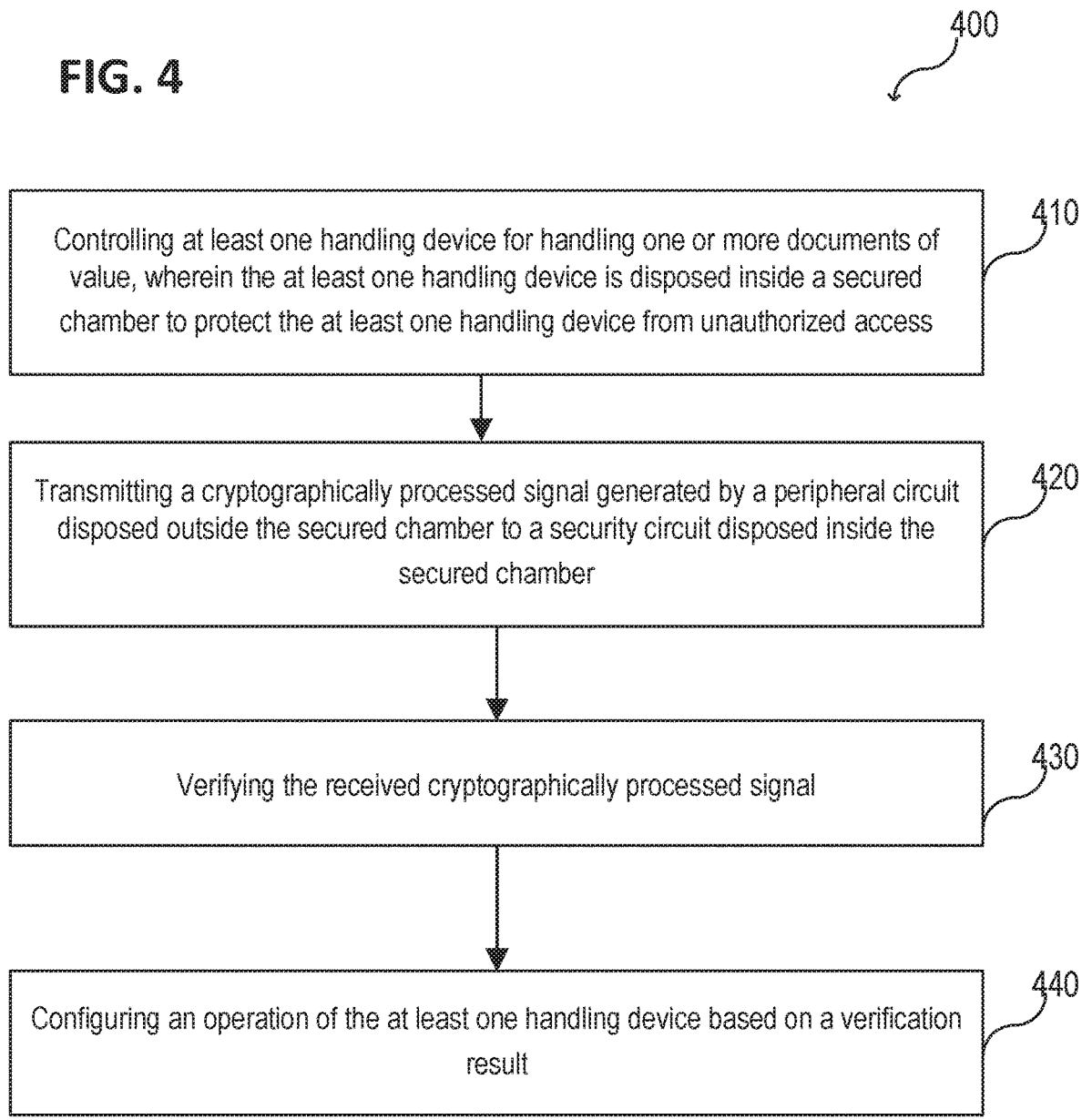

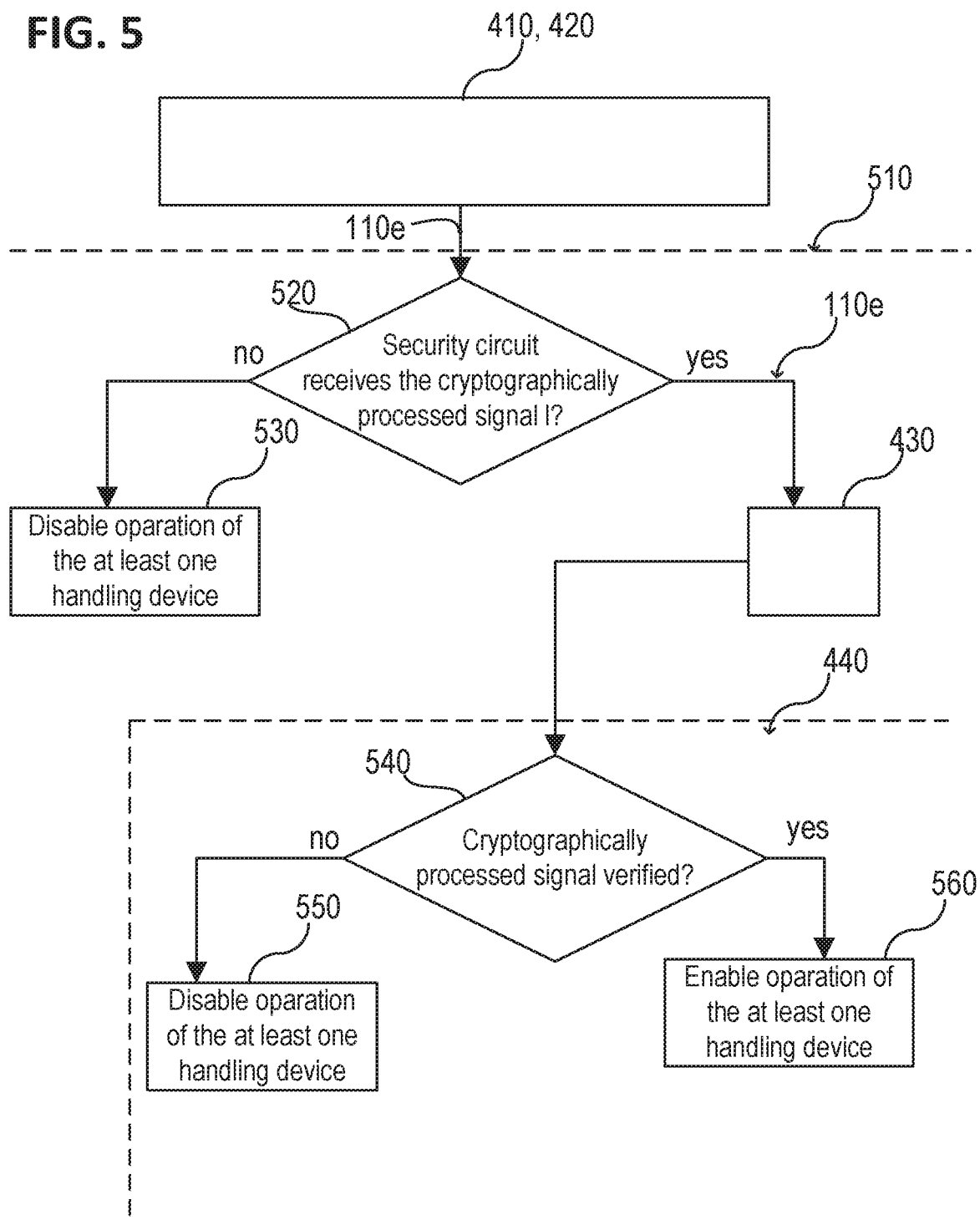

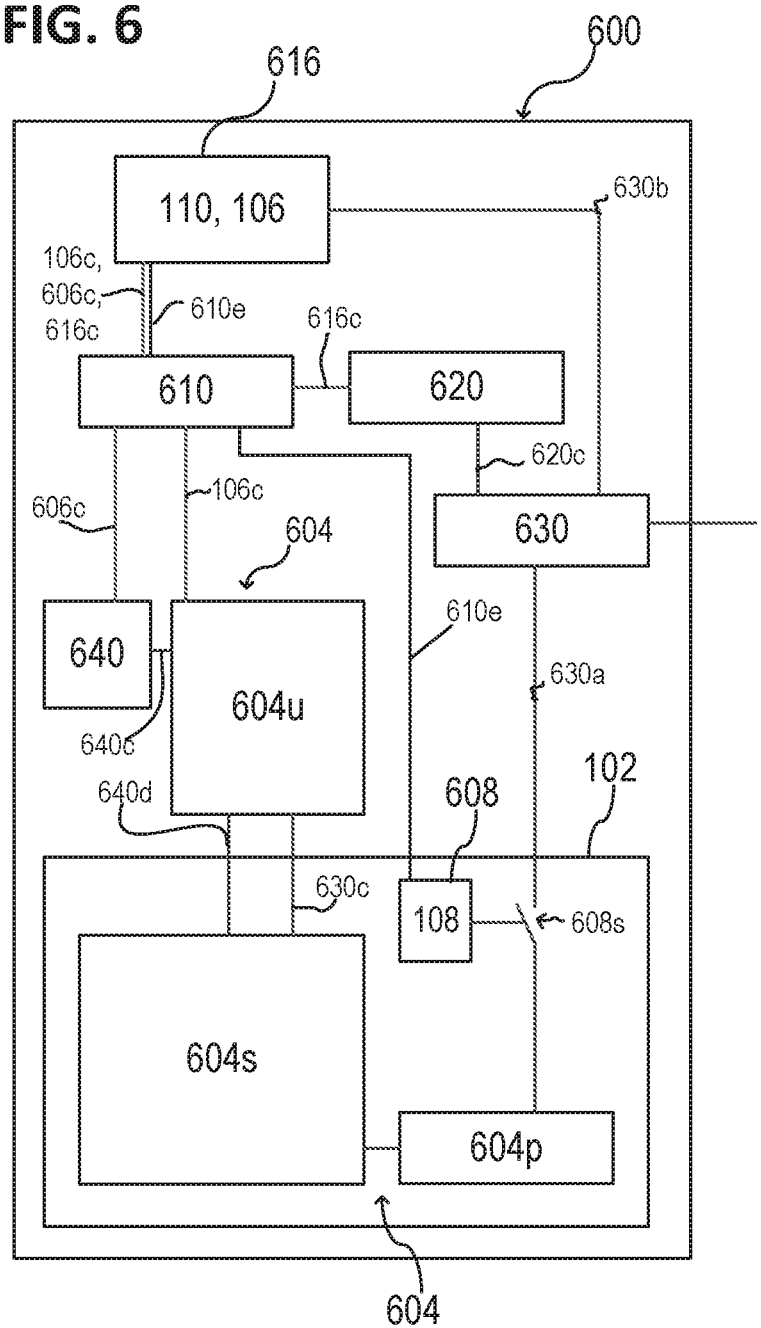

DOCUMENT OF VALUE PROCESSING DEVICE AND METHOD FOR OPERATING A DOCUMENT OF VALUE PROCESSING DEVICE

CROSS-REFERENCE TO RELATED APPLICATIONS

This application claims priority to and the benefit of European Patent Application No. 17 161 517.2, Filed 17 Mar. 2017, the contents of which are hereby incorporated by reference in their entirety.

TECHNICAL FIELD

Various embodiments relate generally to a document of value processing device and a method for operating a document of value processing device.

BACKGROUND

In general, a safe may be used to protect any type of means of payment, e.g. banknotes, coins, gold bullion in bars, and the like) in private locations, e.g. inside a bank or inside another building, or in public locations, e.g. at an outer wall of a bank or another building for public access. An automated teller machine (ATM) or another automated safe arrangement may be provided with various functions, e.g. for depositing cash, dispensing cash and/or recycling cash, as desired. An ATM usually includes a safe to protect the cash stored therein mechanically. However, since the ATM includes electronic modules for operating the ATM, also a software or electronic protection may be necessary. Usually, a communication between an ATM and at least one financial institution may be necessary to make a cash deposit via the ATM and/or to dispense money from the ATM. For security reasons, a communication between an ATM and a financial institution (referred to as a bank) an encrypted communication may be provided. Access to a banking account may be protected by a system including a banking card (e.g. a so-called cash card or ATM card) and a corresponding PIN verification or another suitable verification. The personal verification process may include request of personal verification information (e.g. the PIN) from the bank regarding the respective user of the ATM. Optionally, a banking card may include a cryptographic key, also referred to as personal key (PK) for personal identification processes and/or for authentication processes.

SUMMARY

According to various embodiments, a document of value processing device may include: a secured chamber configured to accommodate one or more documents of value and to protect at least one handling device from unauthorized access; the at least one handling device disposed inside the secured chamber to handle at least an output of the one or more documents of value out of the secured chamber may; a control circuit coupled to the at least one handling device to control an operation of the at least one handling device; and a security circuit disposed inside the secured chamber. The security circuit is configured to receive a cryptographically processed signal, to verify the received cryptographically processed signal, and to disable or enable the operation of the at least one handling device based on a verification result.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a schematic flow diagram of a method for operating a processing device, according to various embodiments;

FIG. 5 shows a schematic flow diagram of a method for operating a processing device, according to various embodiments; and FIG. 6 shows a processing device in a schematic view, according to various embodiments.

DESCRIPTION

Figure 1:
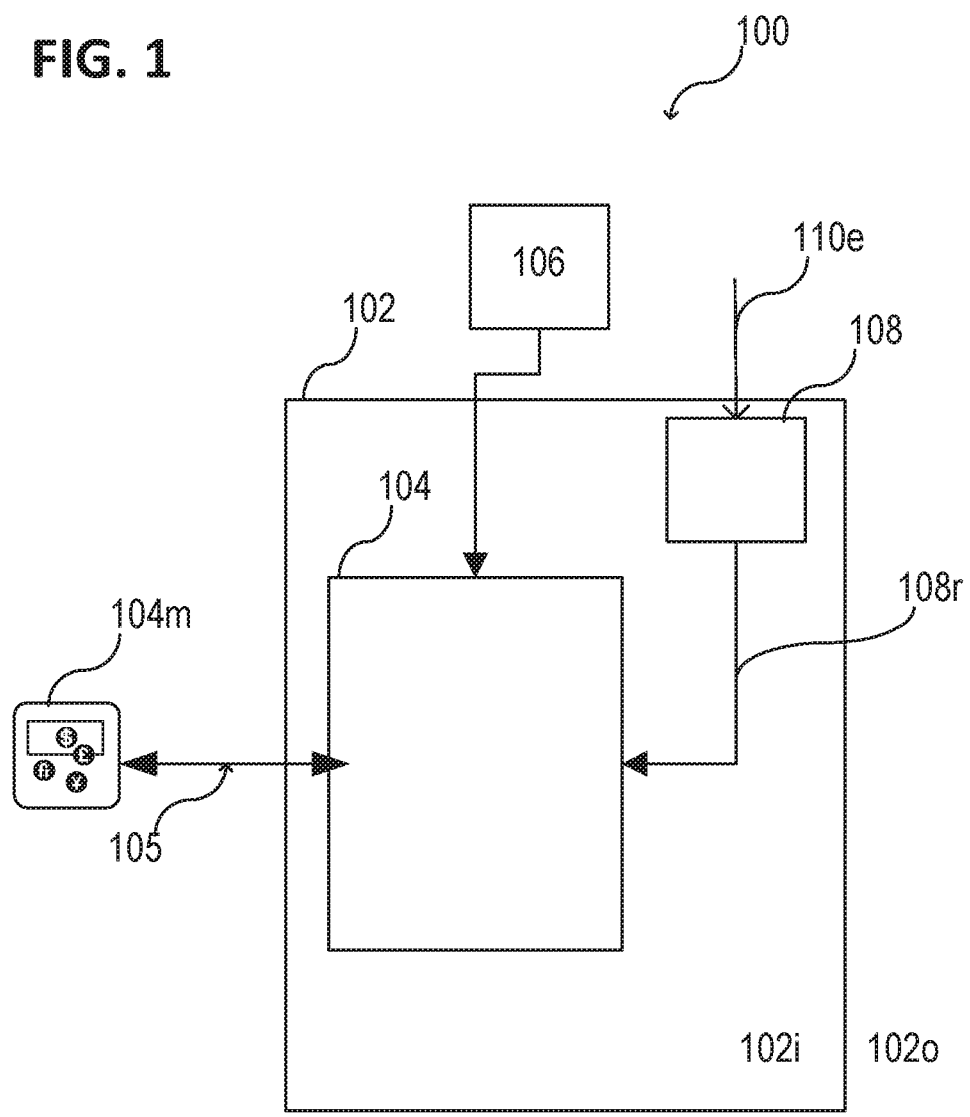
FIG. 1 shows a processing device in a schematic view, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of" with regard to a group of elements (e.g. at least one of A and B, or in the same way, at least one of A or B) may be used herein to mean at least one element from the group consisting of the elements, i.e. the logical and/or. For example, the phrase "at least one of" with regard to a group of elements may be used herein to mean a selection of: one of the listed elements, a plurality of one of the listed elements, a plurality of individual listed elements, or a plurality of a multiple of listed elements.

The term "coupled" is used herein to mean for example communicatively coupled, which may include any type of a direct connection or an indirect connection. The may include any suitable wired connection and/or wireless connection.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

In the recent years, many ATM vendors have hardened their ATMs to prevent offline attacks with the target to get banknotes out of the ATMs. These hardening aspects may include an encryption of a communication line between a dispenser/recycler of an ATM and the ATMs processing system, e.g. to the ATMs microcomputer. However, in some cases it might be difficult to enhance a firmware of the dispenser/recycler of the ATM.

Similar to an ATM, other devices may be used to handle and protect any desired object from access for unauthorized persons. In this case, the one or more objects to be protected may be stored in a secured chamber (also referred to herein as safe), wherein at least one handling device may be used to transport the one or more objects to be protected out of the secured chamber without opening the secured chamber, e.g. without opening a door of the secured chamber. The at least one handling device may be used to provide an access (e.g. for one or more authorized users of the device) to the one or more objects to be protected without providing physical access to the interior of the secured chamber. According to various embodiments, the at least one handling device may be secured against unauthorized operation to prevent unauthorized transport of the one or more objects to be protected out of the secured chamber.

FIG. 1 illustrates a processing device 100 (also referred to as document of value processing device) in a schematic view, according to various embodiments. The processing device 100 may be or may include an automated teller machine (ATM), or in other words, a cash dispenser, a cash recycler, or any other processing device 100 for handling objects and protecting the objects from an unauthorized access. The processing device 100 may include a secured chamber 102 configured to accommodate one or more documents of value (104m) and to protect at least one handling device 104 from unauthorized access. The at least one handling device 104 is disposed inside the secured chamber 102. The secured chamber 102 may include any suitable housing for protecting an interior 102i of the secured chamber 102 from an unauthorized physical access. An authorized physical access to the interior 102i of the secured chamber 102 may be possible through a door provided in the housing, wherein the door mechanism to open and close the door may include one or more locking mechanism (also referred to herein as a lock). The secured chamber 102 including the lock of the door may be configured to prevent unauthorized access to the interior 102i of the secured chamber 102.

According to various embodiments, the at least one handling device 104 may be configured to handle (e.g. to input and/or output, see reference sign 105) one or more documents of value 104m or any other documents of value 104m. One or more documents of value 104m may include any suitable objects as for example banknotes, bars, coins, and the like. The secured chamber 102 may be also referred to as safe 102 and the at least one handling device 104 may be also referred to as safe unit. According to various embodiments, the handling device 104 may be configured as cash dispenser and/or cash recycler. The at least one handling device 104 may be used to store one or more documents of value 104m inside the secured chamber 102 and also to dispense one or more documents of value 104m that are stored inside the secured chamber 102. According to various embodiments, the at least one handling device 104 may be or may include any suitable device for transporting the objects stored in the secured chamber 102 out of the secured chamber 102. Further, the at least one handling device 104 may be or may include any suitable device for transporting objects to be stored in the secured chamber 102 into the secured chamber 102.

According to various embodiments, the processing device 100 may further include a control circuit 106 (also referred to as controller) to control an operation of the at least one handling device 104. The control circuit 106 may be disposed outside 102o the secured chamber 102. The control circuit 106 may be coupled to the at least one handling device 104 to control an operation of the at least one handling device 104. The control circuit 106 may control for example a dispensing and a depositing of one or more documents of value 104m, e.g. transporting banknotes or other objects out of the secured chamber 102, and e.g. transporting banknotes or other objects into the secured chamber 102. The control circuit 106 and the at least one handling device 104 may be also configured to recycle one or more documents of value 104m, e.g. to check the status of banknotes and to withdraw banknotes from circulation if necessary.

According to various embodiments, the control circuit 106 may be configured to operate based on a firmware that is adapted to the at least one handling device 104 to be controlled. The firmware may for example not allow to establish an encrypted communication between the control circuit 106 and the at least one handling device 104.

According to various embodiments, the processing device 100 may further include a security circuit 108 disposed inside the secured chamber 102. The security circuit 108 may be configured to receive a cryptographically processed signal 110e, to verify the received cryptographically processed signal, and to configure 108r the operation of the at least one handling device 104 based on the verification. The term "configure" used herein with regards to "configure" an operation, a communication, or a signal may be understood for example as "modifying", e.g. to disable or to enable an operation, e.g. to disable or enable a communication, e.g. to suppress a signal or to forward a signal; e.g. to output a signal or not. Illustratively, the security circuit 108 may be configured to disable an operation of the at least one handling device 104 to prevent unauthorized operation of the at least one handling device 104m, and to enable an operation of the at least one handling device 104 to allow an authorized operation of the at least one handling device 104m.

In various embodiments, "cryptographically processing" may include any kind of cryptographic security mechanism or security service. By way of example, "cryptographically processing" may include encryption/decryption (symmetric and/or asymmetric), digital signature, digital watermarking, digital hashing, and the like.

The verification of the cryptographically processed signal 110e may be executed by any suitable verification process, e.g. using an encryption and decryption of data and/or using messages including signatures, and the like.

In the case that the secured chamber 102 may be disconnected from the environment in the processing device 100, the presence of the security circuit 108 and its operation may prevent an easy electronic access to the at least one handling device 104 to dispense the one or more documents of value 104m stored inside the secured chamber 102. For example, in the case that the security circuit 108 does not receive the cryptographically processed signal 110e or only receives a corrupted cryptographically processed signal 110e (that can be detected by decrypting the cryptographically processed signal 110e and checking decrypted signal or by checking a signature) the operation at least one handling device 104 may be disabled to prevent any output via the at least one handling device 104. In other words, the at least one handling device 104 may only operate in the case that the security circuit 108 properly receives and properly verifies the cryptographically processed signal 110e provided to the security circuit 108.

According to various embodiments, the security circuit 108 may be configured to determine a status of the cryptographically processed signal and to disable or enable the operation of the at least one handling device based on the determined status. The status of the cryptographically processed signal represents, for example, whether the cryptographically processed signal is properly decrypted by the security circuit 108 or not. For properly decrypting the cryptographically processed signal 110e both, the decryption itself and the decrypted data (or in other words the decrypted information) may be checked. A proper decryption may require using the proper key corresponding to the key used for the encryption of the cryptographically processed signal 110e. According to various embodiments, to check the decrypted data, the decrypted data may be compared with reference data. Illustratively, the expected result of the decryption may be known and stored in the security circuit 108 and may be compared with the actual result of the decryption. According to various embodiments, the security circuit 108 may be configured to enable the operation of the at least one handling device 104 in the case that the cryptographically processed signal 110e is properly decrypted (or in other words is verified), and to disable the operation of the at least one handling device 104 in the other case, i.e. when the cryptographically processed signal 110e is not properly decrypted (or in other words is not verified).

According to various embodiments, the cryptographically processed signal 110e may be received by the security circuit 108 and the authenticity of the cryptographically processed signal 110e is checked via the security circuit 108. However, it may be the case that the cryptographically processed signal 110e is not received by the security circuit 108, e.g. due to a manipulation of the processing device 100 or the communication between the security circuit 108 and the rest of the processing device 100. Therefore, according to various embodiments, the security circuit 108 may be further configured to determine a status of the cryptographically processed signal 110e and to disable or enable the operation of the at least one handling device 104 based on the determined status. The security circuit 108 may be configured to disable the operation of the at least one handling device 104 in the case that the cryptographically processed signal 110e is not received by the security circuit 108. However, in the other case, if the cryptographically processed signal 110e is received by the security circuit 108, it may be decrypted and/or verified as described above.

In the following, various modifications and/or additional features may be described for the processing device 100 described above with reference to FIG. 1.

Figure 2:
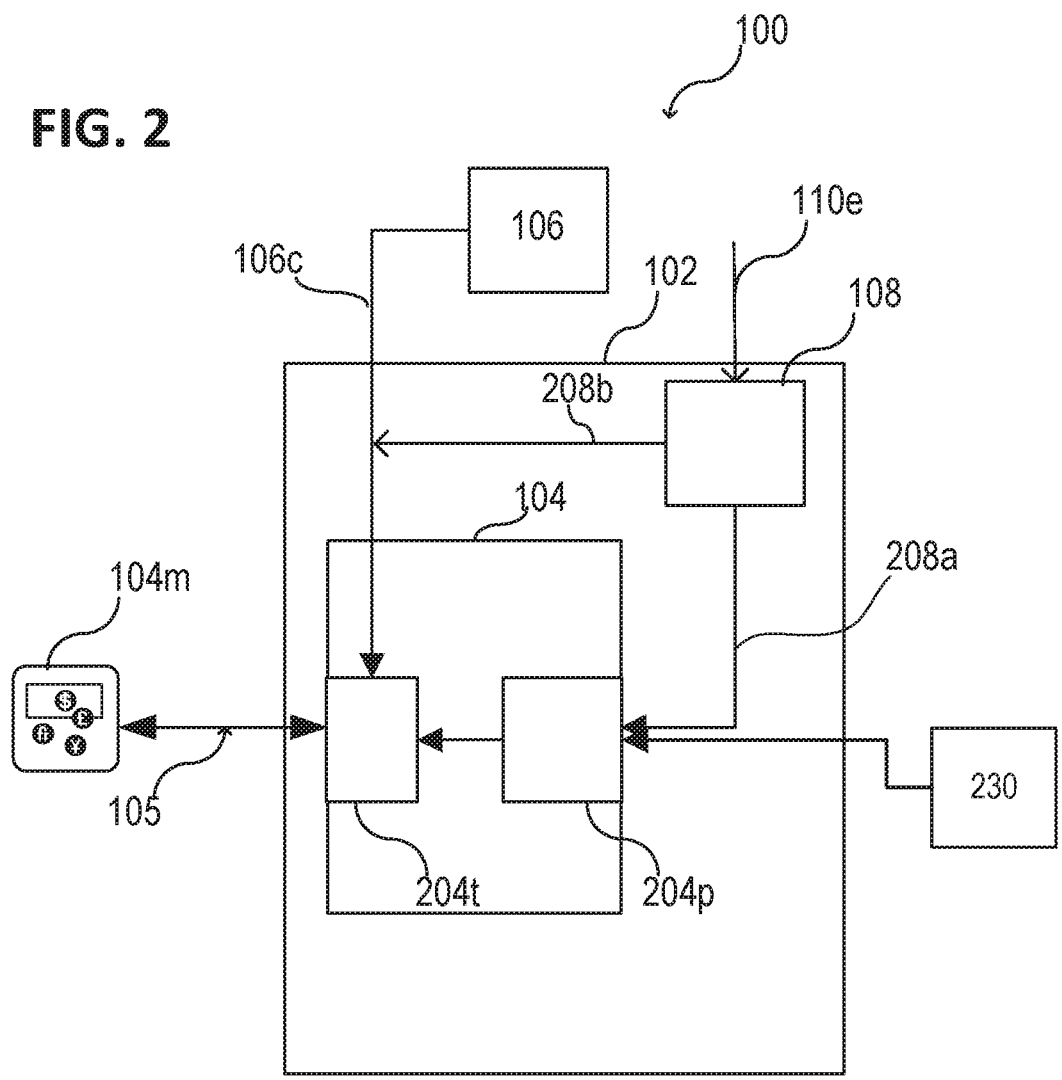
FIG. 2 shows a processing device in a schematic view, according to various embodiments.

FIG. 2 illustrates a processing device 100, in a schematic view, according to various embodiments. The processing device 100 may be configured in a similar way as described above. According to various embodiments, the at least one handling device 104 may include an automated handling arrangement 204t to handle the desired objects and a power supply 204p to supply the automated handling arrangement 204t. According to various embodiments, an external power source 230 may be connected to the power supply 204p to provide electric power to the power supply 204p.

According to various embodiments, the automated handling arrangement 204t may be for example configured to transport banknotes (or any other desired object) into the secured chamber 102 and/or out of the secured chamber 102 controlled by the control circuit 106. Therefore, an attack on the control circuit 106 and/or on electronic components of the automated handling arrangement 204t may be used to get the banknotes out of the secured chamber 102 without the need of mechanically opening the secured chamber 102. Therefore, according to various embodiments, the security circuit 108 may be configured to modify 208a (e.g. to either enable or disable) an operation of the power supply 204p based on the verification. In other words, the security circuit 108 may protect the at least one handling device 104 from an unauthorized operation by disabling the power supply 204p of the at least one handling device 104 if necessary, e.g. in case of a detected attack. In this case, an attack on the control circuit 106 and/or on electronic components of the automated handling arrangement 204t may disable any operation of the automated handling arrangement 204t, which enhances the security properties of the secured chamber 102.

Alternatively or additionally, the security circuit 108 may be configured to modify 208b (e.g. to either enable or disable) a communication 106c between the control circuit 106 and the at least one handling device 204 (or the automated handling arrangement 204t) based on the verification. In other words, the security circuit 108 may protect the at least one handling device 104 (or the automated handling arrangement 204t) from an unauthorized operation by disabling the communication between the control circuit 106 and the at least one handling device 104 (or the automated handling arrangement 204t). In this case, an attack on the control circuit 106 and/or on electronic components of the automated handling arrangement 204t disables any operation of the automated handling arrangement 204t, which enhances the security properties of the secured chamber 102.

According to various embodiments, the security circuit 108 may be configured to include additional security functions, as described in more detail below. The security circuit 108 may be configured, for example, to disable the at least one handling device 104 (e.g. to disable the communication 106c between the control circuit 106 and the at least one handling device 104 and/or to disable the power supply of the at least one handling device 104) in the case of a power loss. According to various embodiments, the security circuit 108 may be configured to operate at an operation voltage (e.g. in a predefined operation voltage range) and to check a status of the operation voltage. Further, the security circuit 108 may be configured to disable the at least one handling device (e.g. to disable the communication 106c between the control circuit 106 and the at least one handling device 104 and/or to disable the power supply of the at least one handling device 104) in the case that the operation voltage meets a predefined operation voltage threshold, e.g. falls below a minimum operation voltage threshold and/or raises above a maximum operation voltage threshold. In other words, the security circuit 108 may be configured to disable the at least one handling device 104 in the case that the actual operation voltage of the security circuit 108 is not within the predefined operation voltage range for the security circuit 108.

Further, the cryptographically processed signal 110e may be a substantially continuous signal. Alternatively, the cryptographically processed signal 110e may be provided only in a predefined time interval, e.g. every minute, every ten minutes, and the like.

According to various embodiments, the security circuit 108 may be configured to enable the operation of the at least one handling device 104 for a pre-defined time period in accordance with the reception of the cryptographically processed signal 110e and based on the verification. Illustratively, a verified cryptographically processed signal 110e may enable the at least one handling device 104 for a pre-defined time period, e.g. for a minute, for ten minutes, and the like. The pre-defined time period may be selected in accordance with the predefined time interval at which the cryptographically processed signal 110e is generated and transmitted to the security circuit 108 to allow a continuous operation of the at least one handling device 104, and therefore of the processing device 100, as a standard operation mode, e.g. in absence of any attacks on the processing device 100. After the pre-defined time period, as long as no further cryptographically processed signal 110e is received and verified, the security circuit 108 may disable the operation of the at least one handling device 104, as described above.

Figure 3:
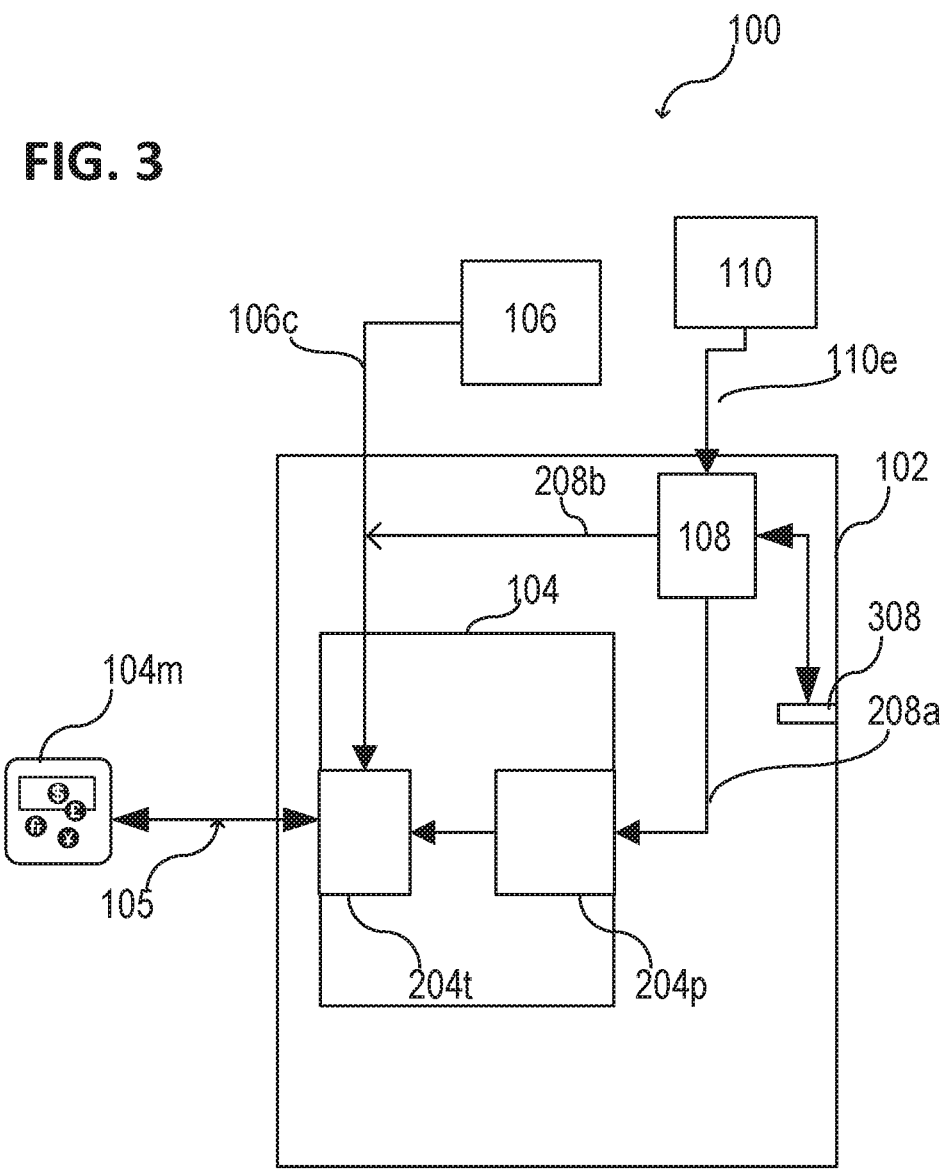
FIG. 3 shows a processing device in a schematic view, according to various embodiments.

FIG. 3 illustrates a processing device 100 in a schematic view, according to various embodiments. The processing device 100 may be configured in a similar way as described above. According to various embodiments, the processing device 100 may include a peripheral circuit 110 configured to generate the cryptographically processed signal 110e and to transmit the cryptographically processed signal 110e to the security circuit 108. Illustratively, the peripheral circuit 110 may communicate with the security circuit 108 in an encrypted manner. As described above, the peripheral circuit 110 may be configured to generate the cryptographically processed signal 110e in a pre-defined time interval, or alternatively, continuously.

According to various embodiments, the peripheral circuit 110 may be configured to generate the cryptographically processed signal 110e based on a sequence of datagrams, wherein the datagrams of the sequence of datagrams are different from each other. Illustratively, the encrypted content of the cryptographically processed signal 110e may vary (e.g. based on a time stamp, a consecutive number, etc.) to avoid a simple signal repeat attack, wherein the attacker could provide a copy of the cryptographically processed signal 110e to the security circuit 108 to enable the operation of the at least one handling device 104 without authorization.

According to various embodiments, verifying the cryptographically processed signal 110e may include decrypting one or more encrypted datagrams. The security circuit 108 may be configured to compare the one or more decrypted datagram with corresponding one or more reference datagrams and to configure the operation of the at least one handling device 104 based in a result of the comparison. Illustratively, the one or more datagrams may be used to check if the encryption, transmission, and decryption of the signal was done properly to allow an operation of the at least one handling device 104 only in this case.

According to various embodiments, the security circuit 108 may be configured to store a key for decrypting the cryptographically processed signal permanently. In other words, the security circuit 108 may include a memory circuit for permanently storing the key. Permanently storing may be understood in such a way, that a power loss or any other deactivation of the security circuit 108 may not lead to a loss of the key.

According to various embodiments, the security circuit 108 may be configured to perform an initialization process for exchanging a common key with the peripheral circuit 110 for encrypted communication. Illustratively, the encrypted communication between the peripheral circuit 110 and the security circuit 108 may be initialized at an initial stage. The security circuit 108 and the peripheral circuit 110 may be configured to perform the initialization process based on an asynchronously encrypted communication (e.g. using Rivest, Shamir, and Adleman (RSA) encryption) or based on any other suitable initialization process.

As illustrated in FIG. 3, according to various embodiments, the processing device 100 may include a hardware protection switch 308 configured to allow a start of the initialization process only in the case that the hardware protection switch 308 is activated. The hardware protection switch 308 may be disposed inside the secured chamber 102. Alternatively, the hardware protection switch 308 may be integrated into a door lock of the secured chamber 102. Illustratively, the hardware protection switch 308 can be activated only manually in the case that the secured chamber 102 is opened. Therefore, a software or electronic attack on the processing device 100 may first require a mechanical attack; wherein after a possible unauthorized opening of the secured chamber 102 a further software or electronic attack would be moot.

FIG. 4 illustrates a method 400 for operating a processing device 100 (e.g. a method for operating an automated teller machine (ATM)) in a schematic flow diagram, according to various embodiments. The method 400 may be configured in a similar way as described above with reference to the processing device 100. Vice versa, the processing device 100 may be configured in a similar way as described below with reference to method 400.

According to various embodiments, the method 400 may include: in 410 controlling at least one handling device 104 for handling one or more documents of value, wherein the at least one handling device 104 is disposed inside a secured chamber 102 to protect the at least one handling device 104 from unauthorized access; in 420, transmitting a cryptographically processed signal 110e generated by a peripheral circuit 110 disposed outside the secured chamber 102 to a security circuit 108 disposed inside the secured chamber 102; and, when the cryptographically processed signal 110e is received by the security circuit 108, in 430, verifying the received cryptographically processed signal 110e; and, in 440, configuring an operation of the at least one handling device 104 based on a verification result.

According to various embodiments, the method 400 may alternatively include: in 410 controlling (e.g. via a control circuit) at least one handling device for handling objects to be protected, wherein the at least one handling device is disposed inside a safe to protect the at least one handling device from unauthorized access; in 420, transmitting a cryptographically processed signal generated by a peripheral circuit disposed outside the safe to a security circuit disposed inside the safe; in 430, verifying the cryptographically processed signal via the security circuit; and in 440, configuring (e.g. either enabling or disabling) an operation of the at least one handling device based on the verification.

FIG. 5 illustrates a method 400 for operating a processing device 100 (e.g. a method for operating an automated teller machine (ATM)) in a schematic flow diagram, according to various embodiments. The method 400 may be configured in a similar way as described above. According to various embodiments, the method 400 may include: in 410, 420 controlling at least one handling device 104 for handling one or more documents of value, wherein the at least one handling device 104 is disposed inside a secured chamber 102 to protect the at least one handling device 104 from unauthorized access; in 420, transmitting a cryptographically processed signal 110e generated by a peripheral circuit 110 disposed outside the secured chamber 102 to a security circuit 108 disposed inside the secured chamber 102; in 510, operating the security circuit 108 based on a status of the cryptographically processed signal 110e, e.g. in 530, disabling an operation of the at least one handling device 104 in the case that the cryptographically processed signal 110e is not received by the security circuit 108 (without loss of generality: status 1); in 430, verifying the cryptographically processed signal 110e via the security circuit 108 in the case that the cryptographically processed signal 110e is received by the security circuit 108; and, in 550, disabling an operation of the at least one handling device 104 in the case the cryptographically processed signal 110e is not verified (without loss of generality: status 2), or, in 560, enabling an operation of the at least one handling device 104 in the case the cryptographically processed signal 110e is verified (without loss of generality: status 3).

As described above, the operation of the at least one handling device 104 may be either disabled or enabled based on a status of the cryptographically processed signal 110e. Determining a status of the cryptographically processed signal 110e may include, e.g. in 540, checking whether the cryptographically processed signal 110e is verified or not. The operation of the at least one handling device 104 may be enabled, in 560, in the case that the cryptographically processed signal is verified, and disabled, in 550, in the case that the cryptographically processed signal 110e is not verified. This may be the case, for example, when a manipulated signal (e.g. a signal encrypted with a wrong key, or a signal having a manipulated content) is used instead of the properly cryptographically processed signal 110e provided by the peripheral circuit 110.

As described above, the operation of the at least one handling device 104 may be further disabled based on a status of the cryptographically processed signal 110e. Determining a status of the cryptographically processed signal 110e may include, e.g. in 520, checking whether the cryptographically processed signal 110e is properly received by the security circuit 108 or not. The operation of the at least one handling device 104 may be disabled, in 530, in the case that the cryptographically processed signal 110e is not properly received, e.g. this may be the case, for example, when the communication between the peripheral circuit 110 and the security circuit 108 is disturbed or, for example, when the security circuit 108 and/or the peripheral circuit 110 are attacked.

FIG. 6 illustrates a cash dispenser/recycler 600 (or in other words an ATM with dispenser and/or recycler functionality) in a schematic view, according to various embodiments. The cash dispenser/recycler 600 may be configured in a similar way as described above with reference to the processing device 100 and method 400, and vice versa.

According to various embodiments, the cash dispenser/recycler 600 may include a secured chamber 102 referred to as safe 102, a control circuit 106, a security circuit 108, a peripheral circuit 110 (also referred to as system PC), in a similar way as described above.

According to various embodiments, the cash dispenser/recycler 600 may include a dispenser/recycler arrangement 604 for recycling banknotes. According to various embodiments, the dispenser/recycler arrangement 604 may include an upper unit 604u disposed outside the safe 102. The upper unit 604u may be coupled to a banknote reader 640. The dispenser/recycler arrangement 604 may further include a safe unit 604s disposed inside the safe 102. The operation of the safe unit 604s may be similar as the operation of the at least one handling device 104 or the automated handling arrangement 204t, as described above. The safe unit 604s may be coupled to a power supply 604p. The security circuit 108 may be configured to configure (e.g. enable or disable) an operation of the safe unit 604s similar to the configuration of the operation of the at least one handling device 104 or the automated handling arrangement 204t, as described above.

According to various embodiments, the cash dispenser/recycler 600 may include a power distributor 630 (also referred to as power distributor circuit) disposed outside the safe 102. The power distributor 630 may be coupled 630a (e.g. electrically connected) to the power supply 604p of the dispenser/recycler arrangement 604. The power distributor 630 may be further coupled 630b to the peripheral circuit 110 and the control circuit 106. The peripheral circuit 110 and the control circuit 106 may be provided as a microcomputer 616 (also referred to as system PC) or any other suitable circuit arrangement. The upper unit 604*u* of the dispenser/recycler arrangement 604 may be supplied with power via a power connection 630*c* to the safe unit 604*s*. Therefore, disabling the power for the safe unit 604*s* via the security circuit 108, as described herein, may also include disabling the power supply for the upper unit 604*u*. Illustratively, the at least one handling device 104 described herein may be configured as a dispenser/recycler arrangement 604 including a first handling unit 604*u* outside the safe 102 and a second handling unit inside the safe 102.

According to various embodiments, the cash dispenser/recycler 600 may include a communication interface 610 (also referred to as communication interface circuit) disposed outside the safe 102 and configured to receive the cryptographically processed signal 110*e* from the peripheral circuit 110 and to forward the cryptographically processed signal 110*e* to the security circuit 108. The communication interface 610 may be further configured to receive the control signal 106*c* from the control circuit 106 and to forward the control signal 106*c* to the dispenser/recycler arrangement 604. The communication interface 610 may be further configured to receive a first additional control signal 606*c* (e.g. for controlling the banknote reader 640) from the control circuit 106 and to forward the first additional control signal 606*c* to the banknote reader 640. The communication interface 610 may be further configured to receive a second additional control signal 616*c* (e.g. for controlling an additional circuit 620) from the control circuit 106 and to forward the second additional control signal 606*c* to the additional circuit 620. The additional circuit 620 may be configured to switch off the power distributor 630 or switch off the power supply 630*a* to the dispenser/recycler arrangement 604 if necessary, e.g. controlled by the control circuit 106.

According to various embodiments, a communication 106*c*, 606*c*, 616*c* between the control circuit 106 and the banknote reader 640, between the control circuit 106 and the dispenser/recycler arrangement 604, and between the control circuit 106 and the additional circuit 620 may be configured as wired (e.g. non-encrypted) communication, e.g. via USB (Universal Serial Bus). The communication interface 610 may include or may be a USB-Hub.

According to various embodiments, a communication 610*e* between the peripheral circuit 110 and the security circuit 108 may be configured as wired encrypted communication, e.g. via USB (Universal Serial Bus).

According to various embodiments, a communication 620*c* between the additional circuit 620 and the power distributor 630 may be configured as any type of suitable communication (e.g. a wired communication).

According to various embodiments, a communication 640*c* between the banknote reader 640 and the upper unit 604*u* of the dispenser/recycler arrangement 604 and a communication 640*d* between the upper unit 604*u* of the dispenser/recycler arrangement 604 and the safe unit 604*s* of the dispenser/recycler arrangement 604 may be configured as any type of suitable communication (e.g. a wired communication).

According to various embodiments, the security circuit 108 may be configured to disable the power support to the power supply 604*p* (e.g. to break the power connection 630*a* between the power distributor 630 and the power supply 604*p*) to disable the operation of the dispenser/recycler arrangement 604. According to various embodiments, the security circuit 108 may be configured to disable the communication 640*d* between the safe unit 604*s* and the upper unit 604*u* of the dispenser/recycler arrangement 604 (e.g. to break communication line 640*d*) to disable the operation of the dispenser/recycler arrangement 604.

As illustrated above, the cash dispenser/recycler 600 may include an additional electronics located in the safe 102, i.e. the security circuit 108, that is communicating with a system PC 616, i.e. the peripheral circuit 110, in a secure way (e.g. using standard encryption algorithms). This security circuit 108 may be part of an encryption box 608 that can be placed into the safe 102 of the cash dispenser/recycler 600, e.g. also as upgrade kit for already working cash dispenser/recycler 600. The security circuit 108 is configured to have the ability to cut the power to the safe unit 604*s* of the cash dispenser/recycler 600 and thus prevent any moving of banknotes in case of a detected attack.

The encryption box 608 and therefore the security circuit 108 is placed in the safe 102 so that it cannot be manipulated from an attacker who has not physical access to the interior 102*i* of the safe 102. A power switch 608*s* may be used that is controlled by the encryption box 608 (i.e. the security circuit 108). The power switch 608*s* may be configured to allow cutting the power line 630*a*, e.g. in the case that the encryption box 608 is not supplied with power. Instead of or additionally to cutting the power line 630*a* to the safe unit 604*s*, the encryption box 608 may be configured to allow cutting the communication line 640*d* to the safe unit 604*s* so that the safe unit 604*s* does not receive any commands from the control circuit to transport bank notes out of the safe 102.

In the initialization phase (i.e. during the initialization process described herein), the system PC 616 and the encryption box 608 are exchanging a key by means of asymmetric encryption, as for example via RSA. The exchanged key may be referred to as a base key or common key. According to various embodiments, the base key can be a 256-bit AES key. All further security relevant communication between the system PC 616 and the encryption box 608 may be secured via the base key.

The base key may be persistently stored in the encryption box 608 so that it survives removal of power. The system PC 616 and the encryption box 608 may exchange the base key with another base key based on timing or other measurements. A base key of the generation x may be simply transmitted encrypted with the base key of the generation x−1. According to various embodiments, a key hierarchy may be used instead of only a single base key. This allows for example an easier to use session keys. The initial exchange of the base key may require an additional hardware authentication (e.g. provided by a hardware protection switch 308, as described above) that guarantees that it is allowed. According to various embodiments, the hardware authentication may be based on an open safe door. The open safe door maybe checked by either using a door contact or by switching a contact on the encryption box 608. The hardware authentication process may be triggered either by a system PC command/action like a TSOP function or any other desired service program or by switching a contact on the encryption box 608 or by opening/closing the safe door (assuming there is a contact wired).

According to various embodiments, the algorithm of the encryption box 608 (or, in other words, of the security circuit 108) may include to listen to lease packets from the system PC 616 (or, in other words, from the peripheral circuit 110). A lease packet may be a datagram encrypted with the base key. Alternatively, the datagram packet can only be signed with the base key. If the encryption box 608 receives the data package and confirms its authenticity (e.g. by being able to decrypt it), it activates the power supply to the safe unit 604*s* for a specific time period, $T_a$. The time period $T_a$ may be smaller than the minimum time that it might take to get access to the communication line 640d of the safe unit 604s and being able to transport banknotes out of the safe 102. The time period $T_a$ may be for example one minute, or less than a minute or greater than a minute. If the next lease packet is not received and properly decrypted within this time, the power supply to the safe unit 604s is cut. According to various embodiments, it may be an obligation of the system PC 616 to feed the encryption box 608 with correct datagrams continuously or at least in pre-defined intervals. The datagrams may include means to prevent simple message replay like counters or random numbers, as described above.

According to various embodiments, during standard operation of the system PC 616 (or, in other words, of the peripheral circuit 110), a software may be used to continuously monitoring the attached encryption box 608 and generating lease packets in a defined time frame. The software may also continuously check if an initialization process is requested.

According to various embodiments, in case that the existence of the encryption box 608 (or, in other words, the security circuit 108) is mandatory, according to the system configuration, but the encryption box 608 cannot be detected (like it is not enumerated on any USB bus) or is behaving in an unexpected way, the a least one of following actions may be taken: an alarm event may be generated and recorded and/or normal operation of the safe unit 604s (e.g. dispensing banknotes) may be suspended.

According to various embodiments, in the case that the system PC 616 detects that the safe unit 604s is disconnected or behaves in an abnormal way that could be part of an attack, the system PC 616 may switch the safe unit 604s off by using the additional circuit 620 and the power distributor 630 and/or by issuing a special command to the encryption box 608.

According to various embodiments, the encryption box 608 (or, in other words, the security circuit 108) may include a real time clock and a persistent memory for logging information. The encryption box 608 may log relevant events like expired leases or key initialization or changes. These events contain real-time-clock time stamps. This log can be read via the communication interface 610 in a secured way and or directly tapped from the encryption box 608.

In the following, various examples are provided with reference to the figures and embodiments described above.

Example 1 is a processing device 100 (also referred to as document of value processing device), including: a secured chamber 102 configured to accommodate one or more documents of value 104m and to protect at least one handling device 104 from unauthorized access; the at least one handling device 104 disposed inside the secured chamber 102 to handle at least an output of the one or more documents of value 104m out of the secured chamber may 102; a control circuit 106 coupled to the at least one handling device 104 to control an operation of the at least one handling device 104; and a security circuit 108 disposed inside the secured chamber 102, wherein the security circuit 108 is configured to receive a cryptographically processed signal 110e, to verify the received cryptographically processed signal 110e, and to disable or enable the operation of the at least one handling device 104 based on a verification result.

According to various embodiments, a document of value referred to herein may be any desired object to be protected, e.g. means of payment (like for example banknotes), bars, coins, bank cards, smart cards, and the like. According to various embodiments, disable an operation of the at least one handling device 104, as referred to herein, may be understood as preventing an unauthorized operation of the at least one handling device 104 to prevent an unauthorized output of the one or more documents of value 104m out of the secured chamber 102 by the at least one handling device 104, e.g. in case of an attack on the processing device 100. According to various embodiments, enable an operation of the at least one handling device 104, as referred to herein, may be understood as allowing an authorized operation of the at least one handling device 104 to provide an authorized output of the one or more documents of value 104m out of the secured chamber 102 by the at least one handling device 104, e.g. in case of a standard operation of the processing device 100 based on a request of an authorized user. According to various embodiments, a secured chamber 102, as referred to herein, may include a housing configured to prevent unauthorized access to the interior of the housing and to allow an authorized access to the interior of the housing, e.g. via a door in the housing that can be locked via a door lock. According to various embodiments, the secured chamber 102 may be or may include a safe. The at least one handling device 104 may be or may include a so-called safe unit. According to various embodiments, the control circuit 106 may be or may be part of a controller. According to various embodiments, the security circuit 108 may be or may be part of a security controller. According to various embodiments, the cryptographically processed signal 110e may include any type of encryption and/or encrypted signature (and the like) that is suitable for verifying the authenticity of the signal transmitted to the security circuit 108.

In Example 2, the processing device 100 of Example 1 may optionally include that the security circuit 108 is configured to enable the operation of the at least one handling device 104, when the cryptographically processed signal 110e is verified. Further, the security circuit 108 is configured to disable the operation of the at least one handling device 104, when the cryptographically processed signal 110e is not verified. In other words, the security circuit 108 is configured to enable the operation of the at least one handling device 104 only in the case that the cryptographically processed signal 110e is verified.

In Example 3, the processing device 100 of Example 1 or 2 may optionally include that the security circuit 108 is further configured to disable the operation of the at least one handling device 104 when the cryptographically processed signal 110e is not received at the security circuit 108.

In Example 4, the processing device 100 of any one of Examples 1 to 3 may optionally include that the at least one handling device 104 is further configured to handle an input of the one or more documents of value 104m into the secured chamber 102. According to various embodiments, the at least one handling device 104 may be also configured to store the one or more documents of value 104m in the secured chamber 102.

In Example 5, the processing device 100 of any one of Examples 1 to 4 may optionally include that the at least one handling device 104 includes an automated handling arrangement 204t to handle the one or more documents of value 104m and a power supply 204p to supply the automated handling arrangement.

In Example 6, the processing device 100 of Example 5 may optionally include that the security circuit 108 is configured to enable or disable an operation of the power supply 204p based on the verification result.

In Example 7, the processing device 100 of any one of Examples 1 to 6 may optionally include that the security circuit 108 is configured to enable the operation of the at least one handling device 104 for a pre-defined time period in accordance with the reception of the cryptographically processed signal 110e and based on the verification result.

In Example 8, the processing device 100 of any one of Examples 1 to 7 may optionally include that the security circuit 108 is configured to operate at an operation voltage and to disable the at least one handling device 104 when the operation voltage meets a predefined operation voltage threshold.

In Example 9, the processing device 100 of any one of Examples 1 to 8 may optionally include that the security circuit 108 is configured to enable or disable a communication between the control circuit 106 and the at least one handling device 104 based on the verification result.

In Example 10, the processing device 100 of any one of Examples 1 to 9 may optionally include that the security circuit 108 is configured to perform an initialization process for exchanging a common key with a peripheral circuit 110 for cryptographically processing a signal and for verifying the cryptographically processed the signal 110e.

In Example 11, the processing device 100 of Example 10 may optionally include that the security circuit 108 is configured to permanently store the common key.

In Example 12, the processing device 100 of Example 10 or 11 may optionally include that the security circuit 108 is configured to perform the initialization process based on an asynchronously encrypted communication with the peripheral circuit 110.

In Example 13, the processing device 100 of any one of Examples 10 to 12 may optionally further include a hardware protection switch 308 configured to allow a start of the initialization process only when the hardware protection switch 308 is activated.

In Example 14, the processing device 100 of Example 13 may optionally include that the hardware protection switch 308 is disposed inside the secured chamber 102 or that the hardware protection switch 308 is integrated into a door lock of the secured chamber 102.

In Example 15, the processing device 100 of any one of Examples 1 to 14 may optionally further include: the peripheral circuit 110, wherein the peripheral circuit 110 is configured to generate the cryptographically processed signal 110e and to transmit the cryptographically processed signal 110e to the security circuit 108.

In Example 16, the processing device 100 of Example 15 may optionally include that the peripheral circuit 110 is configured to generate the cryptographically processed signal 110e in a pre-defined time interval.

In Example 17, the processing device 100 of Example 15 or 16 may optionally include that the peripheral circuit 110 is configured to generate the cryptographically processed signal 110e based on a sequence of datagrams. Further, the datagrams of the sequence of datagrams may be different from each other. The datagrams may include a real-time stamp or a consecutive sequence of numbers.

In Example 18, the processing device 100 of any one of Examples 1 to 17 may optionally include that the security circuit 108 is further configured to decrypt data of the cryptographically processed signal 110e and to compare the decrypted data with reference data to verify the cryptographically processed signal 110e.

Example 19 is a method for operating a document of value processing device 100 (e.g. an automated teller machine (ATM)), the method including: controlling at least one handling device 104 for handling one or more documents of value, wherein the at least one handling device 104 is disposed inside a secured chamber 102 to protect the at least one handling device 104 from unauthorized access; transmitting a cryptographically processed signal 110e generated by a peripheral circuit 110 disposed outside the secured chamber 102 to a security circuit 108 disposed inside the secured chamber 102; and, when the cryptographically processed signal 110e is received by the security circuit 108, verifying the received cryptographically processed signal 110e; and enabling or disabling an operation of the at least one handling device 104 based on a verification result.

In Example 20, the method of Example 19 may optionally include that enabling or disabling an operation of the at least one handling device 104 includes enabling the operation of the at least one handling device 104, when the cryptographically processed signal 110e is verified. Further, enabling or disabling an operation of the at least one handling device 104 includes disabling the operation of the at least one handling device 104, when the cryptographically processed signal 110e is not verified.

In Example 21, the method of Example 19 or 20 may optionally further include disabling the operation of the at least one handling device 104 when the cryptographically processed signal 110e is not received at the security circuit 108.

In Example 22, the method of any one of Examples 19 to 21 may optionally include that controlling at least one handling device 104 includes at least one of the following: controlling an input of the one or more documents of value into the secured chamber 102, or controlling an output of the one or more documents of value out of the secured chamber 102.

In Example 23, the method of any one of Examples 19 to 22 may optionally include that enabling or disabling an operation of the at least one handling device 104 includes enabling or disabling a power supply of the at least one handling device 104 based on the verification result.

In Example 24, the method of any one of Examples 19 to 23 may optionally include that the operation of the at least one handling device 104 is enabled for a pre-defined time period in accordance with the reception of the cryptographically processed signal 110e at the security circuit 108 and based on the verification result.

In Example 25, the method of any one of Examples 19 to 24 may optionally include that enabling or disabling an operation of the at least one handling device 104 includes enabling or disabling a communication between the control circuit 106 and the at least one handling device 104 based on the verification result.

In Example 26, the method of any one of Examples 19 to 25 may optionally further include disabling the at least one handling device 104 when an operation voltage of the security circuit 108 meets a predefined operation voltage threshold.

In Example 27, the method of any one of Examples 19 to 26 may optionally further include exchanging a common key between the security circuit 108 and the peripheral circuit 110 for cryptographically processing a signal and for verifying the cryptographically processed the signal.

In Example 28, the method of Example 27 may optionally further include permanently storing the common key in the security circuit 108.

In Example 29, the method of Example 27 or 27 may optionally include that exchanging the common key includes an asynchronously encrypted communication between the security circuit 108 and the peripheral circuit 110.

In Example 30, the method of any one of Examples 27 to 29 may optionally further include activating a hardware protection switch 308 to enable the exchange of the common key.

In Example 31, the method of Example 30 may optionally include that activating a hardware protection switch includes manually activating the hardware protection switch, wherein the hardware protection switch is disposed inside the secured chamber 102, or wherein the hardware protection switch is integrated into a door lock of the secured chamber 102.

In Example 32, the method of any one of Examples 19 to 31 may optionally further include generating the cryptographically processed signal 110e in a pre-defined time interval, and that enabling or disabling an operation of the at least one handling device 104 includes enabling the operation of the at least one handling device 104 in accordance with the pre-defined time interval.

In Example 33, the method of any one of Examples 19 to 32 may optionally include that the cryptographically processed signal 110e includes a sequence of datagrams. Further, the datagrams of the sequence of datagrams may be different from each other. Further, the sequence of datagrams may be used for verifying the cryptographically processed signal 110e.

In Example 34, a security circuit 108 disposed inside a safe of an automated teller machine is used to either enable or disable an operation of a handling device 104 for handling means of payment disposed inside the safe based on an encrypted communication between the security circuit 108 and a peripheral communication circuit outside the safe.

Example 35 is an automated teller machine ATM, including: a safe for protecting at least one safe unit from unauthorized access; a security circuit 108 disposed inside the safe, wherein the security circuit 108 is configured to receive a cryptographically processed signal 110e from a peripheral circuit 110 outside the safe, to verify the received cryptographically processed signal 110e, and to release an operation of the at least one safe unit based on the verification result. According to various embodiments, release an operation, as referred to herein, may be understood as enable an operation as long as this is authorized and otherwise disabling the operation.

Example 36 is a safe arrangement 100, 600 (e.g. an automated teller machine (ATM)) including: a secured chamber 102 for protecting at least one handling device 104 from unauthorized access; the at least one handling device 104 that is disposed inside the safe to handle one or more documents of value 104m (e.g. to handle banknotes, gold, coins, etc.); a control circuit 106 (e.g. disposed outside the safe and) coupled to the at least one handling device 104 to control an operation of the at least one handling device 104; and a security circuit 108 disposed inside the secured chamber 102, wherein the security circuit 108 is configured to receive a cryptographically processed signal 110e, to verify the received cryptographically processed signal 110e, and to configure (e.g. disable or enable) the operation of the at least one handling device 104 based on the verification.

In Example 37, the safe arrangement 100, 600 of Example 36 may optionally include that the at least one handling device 104 is configured to allow at least one of the following: to input means of payment into the secured chamber 102, to store means of payment in the secured chamber 102, or to output means of payment out of the secured chamber 102.

In Example 38, the safe arrangement of Example 36 or 37 may optionally further include a power distributor circuit 630 disposed outside the safe and coupled to a power supply 204p of the at least one handling device 104.

In Example 39, the safe arrangement of any one of Examples 36 to 38 may optionally further include a communication interface circuit 610 disposed outside the secured chamber 102 and configured to receive the cryptographically processed signal 110e from a peripheral circuit 110 and to forward the cryptographically processed signal 110e to the security circuit 108.

In Example 39, the safe arrangement of Example 38 may optionally include that the communication interface circuit is further configured to receive a first additional control signal 106c from the control circuit 106 and to forward the first additional control signal to the at least one handling device 104 to control the at least one handling device 104.

In Example 40, the safe arrangement of Example 38 or 39 may optionally include that the communication interface circuit is further configured to receive a second additional control signal 106c from the control circuit 106 and to forward the second additional control signal to an additional control circuits 620 to configure a power distributor circuit 630 (e.g. to enable or disable a power supply for the at least one handling device 104).

Example 41 is a method for operating a safe arrangement (e.g. an automated teller machine (ATM)), the method including: controlling (e.g. via a control circuit) at least one handling device 104 for handling means of payment (e.g. banknotes, gold, coins, etc.), wherein the at least one handling device 104 is disposed inside a secured chamber 102 to protect the at least one handling device 104 from unauthorized access; transmitting a cryptographically processed signal 110e generated by a peripheral circuit 110 disposed outside the secured chamber 102 to a security circuit 108 disposed inside the secured chamber 102; and, when the cryptographically processed signal 110e is received at the security circuit 108, verifying the cryptographically processed signal via the security circuit; and configuring an operation of the at least one handling device based on the verification. Configuring an operation of the at least one handling device 104 includes disabling or enabling the operation of the at least one handling device 104. The operation of the at least one handling device may be enabled or disabled for example by disabling or enabling a power supply to the at least one handling device 104 and/or by disabling or enabling a communication between the at least one handling device 104 and the control circuit for controlling the at least one handling device 104. According to various embodiments, the security circuit 108 may be provided with a security box disposed in the secured chamber 102.

According to various embodiments, controlling at least one handling device 104 may include at least one of the following: controlling an input into the secured chamber 102 via the at least one handling device 104 and controlling an output out of the secured chamber 102 via the at least one handling device 104.

Example 42 is an automated teller machine (ATM), including: a safe for protecting at least one safe unit 604s from unauthorized access; a security circuit 108 disposed inside the secured chamber 102, wherein the security circuit 108 is configured to receive a cryptographically processed signal 110e, to verify the received cryptographically processed signal 110e, and to release an operation of the at least one safe unit 604s based on the verification.

Example 43 is a safe arrangement (e.g. an automated teller machine (ATM)), including: a secured chamber 102 for protecting at least one handling device 104 from unauthorized access; the at least one handling device 104 (e.g. at least one safe unit 604s) disposed inside the secured chamber 102 to handle means of payment; and a security circuit 108 disposed inside the secured chamber 102, wherein the security circuit 108 is configured to receive a cryptographically processed signal 110e, to verify the received cryptographically processed signal 110e, and to configure (e.g. either disable or enable) an operation of the at least one handling device 104 based on the verification.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A document of value processing device, comprising:
    at least one handling device;
    a secured chamber configured to accommodate one or more documents of value and to protect the at least one handling device from unauthorized access, the at least one handling device disposed inside the secured chamber to handle at least an output of the one or more documents of value out of the secured chamber;
    a control circuit coupled to the at least one handling device to control an operation of the at least one handling device; and
    a security circuit disposed inside the secured chamber, wherein the security circuit is configured to receive a cryptographically processed signal, to verify the received cryptographically processed signal, and to disable or enable the operation of the at least one handling device based on a verification result using a power switch disposed inside the secured chamber.

2. The document of value processing device of claim 1, wherein the security circuit is configured to enable the operation of the at least one handling device when the cryptographically processed signal is verified and to disable the operation of the at least one handling device when the cryptographically processed signal is not verified.

3. The document of value processing device of claim 1, wherein the security circuit is further configured to disable the operation of the at least one handling device when the cryptographically processed signal is not received.

4. The document of value processing device of claim 1, wherein the at least one handling device is further configured to handle an input of the one or more documents of value into the secured chamber.

5. The document of value processing device of claim 1, wherein the at least one handling device comprises an automated handling arrangement to handle the one or more documents of value and a power supply to supply the automated handling arrangement, and wherein the security circuit is configured to enable or disable an operation of the power supply based on the verification result.

6. The document of value processing device of claim 1, wherein the security circuit is configured to enable or disable a communication between the control circuit and the at least one handling device based on the verification result.

7. The document of value processing device of claim 1, wherein the security circuit is configured to perform an initialization process for exchanging a common key with a peripheral circuit for cryptographically processing a signal and for verifying the cryptographically processed the signal.

8. The document of value processing device of claim 7, wherein the security circuit is configured to perform the initialization process based on an asynchronously encrypted communication with the peripheral circuit.

9. The document of value processing device of claim 7, further comprising:
    a hardware protection switch configured to allow a start of the initialization process only when the hardware protection switch is activated.

10. The document of value processing device of claim 1, further comprising:
    a peripheral circuit configured to generate the cryptographically processed signal and to transmit the cryptographically processed signal to the security circuit.

11. The document of value processing device of claim 10, wherein the peripheral circuit is configured to generate the cryptographically processed signal based on a sequence of datagrams, wherein the datagrams of the sequence of datagrams are different from each other.

12. A method for operating a document of value processing device, the method comprising:
    controlling at least one handling device for handling one or more documents of value, wherein the at least one handling device is disposed inside a secured chamber to protect the at least one handling device from unauthorized access;
    transmitting a cryptographically processed signal generated by a peripheral circuit disposed outside the secured chamber to a security circuit disposed inside the secured chamber; and, when the cryptographically processed signal is received by the security circuit,
    verifying the received cryptographically processed signal; and
    configuring an operation of the at least one handling device based on a verification result using a power switch disposed inside the secured chamber.

13. The method of claim 12, wherein configuring an operation of the at least one handling device comprises:
    enabling the operation of the at least one handling device when the cryptographically processed signal is verified; and
    disabling the operation of the at least one handling device when the cryptographically processed signal is not verified.

14. The method of claim 12, wherein controlling at least one handling device comprises controlling an input of the one or more documents of value into the secured chamber.

15. The method of claim 12, wherein controlling at least one handling device comprises controlling an output of the one or more documents of value out of the secured chamber.

* * * * *